June 26, 1962  J. L. VIECELI  3,040,648
BREWER FOR COFFEE
Filed April 15, 1959  2 Sheets-Sheet 1
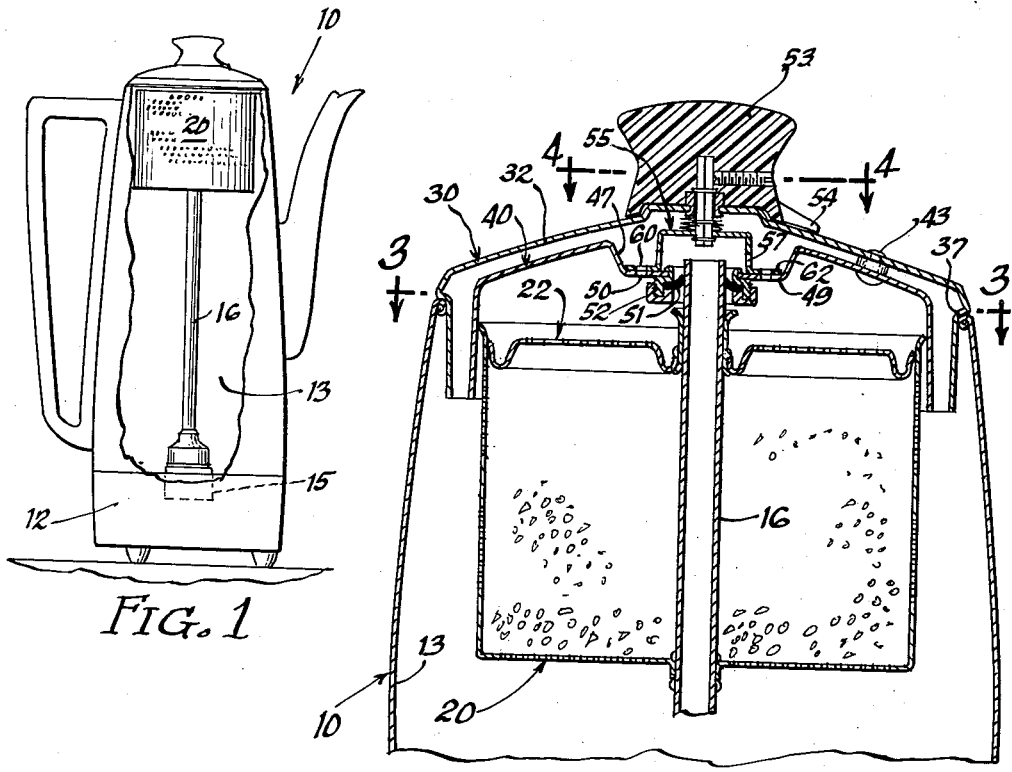
FIG. 1
FIG. 2
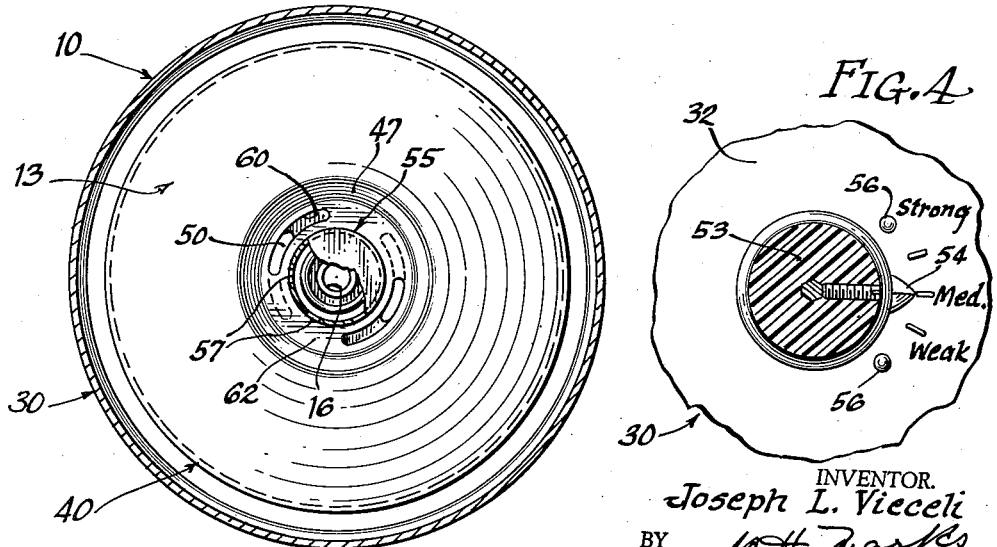
FIG. 3
FIG. 4
INVENTOR.
Joseph L. Vieceli
BY
Attorneys June 26, 1962
J. L. VIECELI
3,040,648
BREWER FOR COFFEE
Filed April 15, 1959
2 Sheets-Sheet 2
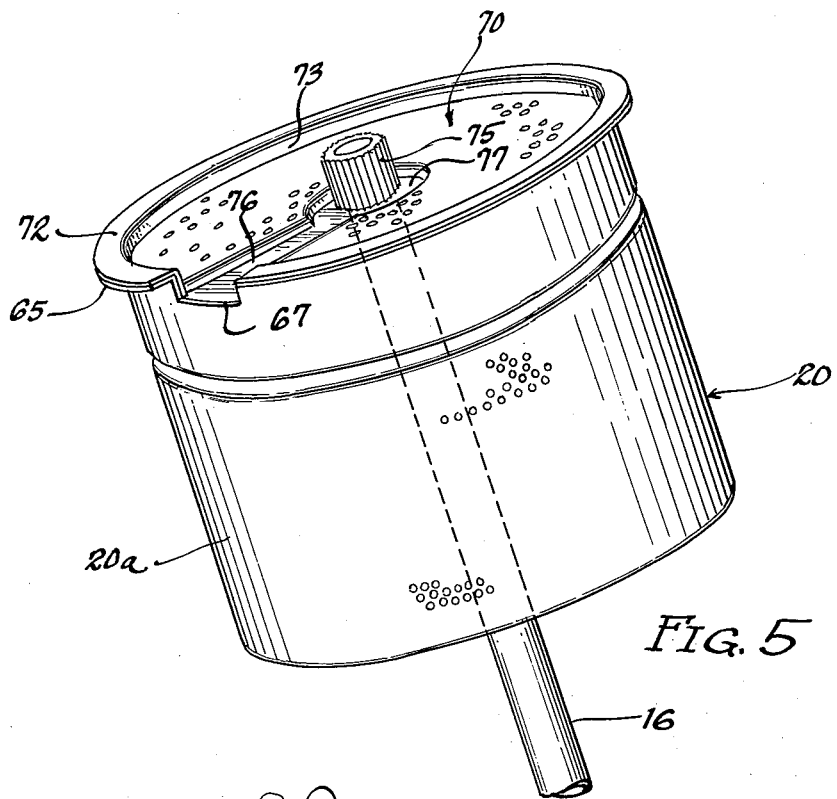
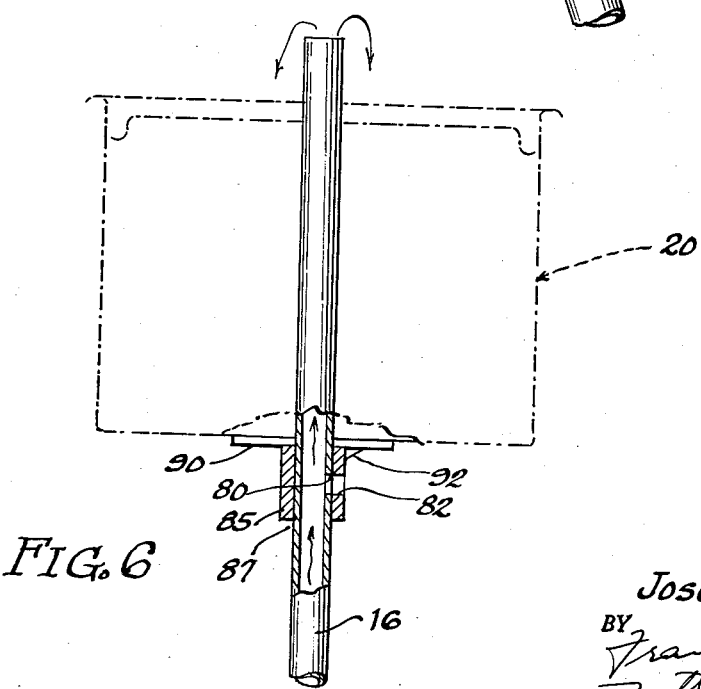
INVENTOR.
Joseph L. Vieceli
BY
Frank H. Marks
Nathan H. Kraus,
Attorneys

United States Patent Office 3,040,648
Patented June 26, 1962

3,040,648
BREWER FOR COFFEE
Joseph L. Vieceli, Cicero, Ill., assignor to Sears, Roebuck and Co., Chicago, Ill., a corporation of New York
Filed Apr. 15, 1959, Ser. No. 806,523
3 Claims. (Cl. 99—311)

My invention relates to brewing devices of the type especially suitable for producing decoctions of coffee, tea, etc., and popularly known on the market as "coffeemakers" of the so-called percolator type.

More especially, my invention constitutes an improvement in electrical automatic coffeemakers of the percolator type having novel means for controlling the strength of the decoction.

Various means have been suggested over a period of many years for controlling the strength of the brew in devices of this general character, involving a variety of principles. Some of these devices vary the period of percolation to a greater or shorter length of time according to the strength desired in the ultimate brew; other devices depend upon temperature control, as by means of an adjustable thermostat. Such devices are subject to various objections, among them being a deterioration of flavor. Furthermore, where temperature control is used to adjust strength of brew, a weak brew is usually too cold for most palates, especially after addition of cream.

According to my invention the strength of the decoction may be varied by controlling the amount of water conducted through the solids which are to be decocted or extracted, as a result of which I am able to obtain a beverage of highly superior flavor, lacking the overcooked flavor incident to the use of prior devices, and also maintaining the desired temperature at all strengths.

Various other objects and advantages will become apparent as the description proceeds.

Referring now to the drawings forming a part of this specification and illustrating certain preferred embodiments of my invention, FIG. 1 is a side elevation of an electrical automatic brewer of the domestic type embodying my invention, certain parts being cut away in order more clearly to illustrate the construction;

FIG. 2 is a fragmentary section on an enlarged scale of the upper part of the device shown in FIG. 1;

FIG. 3 is a transverse sectional view taken substantially along the line 3—3 of FIG. 2;

FIG. 4 is a similar section taken substantially along the line 4—4 of FIG. 2;

FIG. 5 is a fragmentary perspective view of a portion of a coffee brewer embodying another embodiment of my invention, and FIG. 6 is a fragmentary view, partly in elevation and partly in section, illustrating still another embodiment of my invention, with the basket portion indicated in dot-dash lines.

The numeral 10 indicates the side wall of a domestic coffeemaker of the type contemplated by my invention, said side wall being generally cylindrical and defining a liquid container 13. In the base portion 12 is housed a suitable electrical heating element (not shown), the heat being concentrated according to standard practice in the center portion, whereby upon closing the circuit boiling is initiated almost instantly within the so-called "pump" element 15 carried at the base of a tubular stem 16, element 15 normally resting on the bottom of container 13 and directly over the heating element. The pump element may be of standard construction and hence need not be shown in detail.

Carried on the upper part of the stem 16 is a perforated basket 20, also generally cylindrical in shape and open at the top, the stem 16 extending substantially above the upper extremity of said basket. The basket is closed by a removable perforated lid 22 (FIG. 2) which fits snugly in the top portion of the basket.

It will be understood that the parts which come in contact with liquids in the brewer are formed of a suitable metal or the like which will not adversely affect the flavor of the brew, such as aluminum, stainless steel, etc.

The operation of the construction heretofore described conforms substantially to the ordinary or standard type of percolator—by creation of pressure within the "pump" water is forced up the stem 16, overflowing and falling upon the perforated lid 22 through which it passes into the basket 20 where it contacts the comminuted coffee or other material to be decocted, the liquid extract then passing through the perforations of the basket and back into the main body of the liquid within the container 13.

In accordance with my invention I provide adjustable by-pass means for the water which, in this embodiment, comprises a main lid portion indicated generally by the numeral 30 having a dome portion 32, a more or less cylindrical flange portion 35, and a shoulder portion 37, seating upon the upper extremity of wall 10.

Spaced inwardly from the main lid portion 30 is a secondary lid portion 40 which substantially conforms in contour with the dome and flange portions of the main lid portion, thus providing a continuous passage between lid portions 30 and 40, said lid portions being retained in such spaced relation by suitable means such as a plurality of rivets 43 spaced around said lid portions. The secondary lid portion 40 has formed in the central portion thereof a cup-shaped depression 47 having a center opening only slightly larger than stem 16, whereby the latter may snugly extend therethrough. The bottom wall 49 of cup 47 is provided with arcuate passages 50. The stem 16 is secured in fluid tight relation to cup 47 by means of a gasket 51 of "neoprene" or suitable synthetic rubber or plastic, said gasket being attached to a ring 52 attached to cup 47.

To the top of the lid a suitable knob 53 is rotatably attached, a pointer 54 or the like being carried thereby and adapted to cooperate with indicia fixed on the outside of dome portion 32 of main lid 30. (FIG. 4.) Suitable stops 56 on the lid limit movement of the knob. Secured to the knob within the lid so as to be rotatable therewith is a valve element 55, in this case of inverted cup shape, although it might be of spider form, having passages 57 in the side wall thereof and passages 60 in a peripheral horizontal flange portion 62 thereof. Said passages 60 are preferably arcuate, corresponding in length with passages 50 and adapted to overlie and mate therewith.

The operation of the device just described will be readily apparent. Before any brewing operation the pointer 54 is set to the desired strength by rotation of knob 53. As in any percolator, when sufficient pressure has been created to actuate the "pump" at the base of stem 16, hot water will be forced therethrough and discharged from its upper extremity, said water escaping through the passages 57 in valve 55 into the space between the lid elements 32 and 40. A portion of the water will flow down onto the basket lid 22 through the valve openings 50 and 60, the latter having initially been adjusted by rotation of knob 53 in setting pointer 54 so that the effective passages are of a size which will produce a beverage of the desired strength. Obviously, the larger the opening in the valve the more water will be permitted to flow through and act upon the beverage solids in the basket 20 in the course of a decoction period of a given length of time, and hence the greater the extraction and resultant strength of the brew.

The excess water beyond that which has been permitted to flow through the valve for decoction purposes will, of course, escape through the bypass means provided by the space between lid elements 32 and 40, said excess being thus returned to the main body of liquid within the pot without having contacted the beverage solids within the basket.

Referring now to the embodiment shown in FIG. 5, the percolating mechanism may be the same as in any standard percolator, as described in the previous embodiment, but having a different form of by-pass. The hollow stem 16, as above, extends through basket portion 20 and slightly above the top thereof. The top of the basket is provided with an outwardly extending peripheral flange 65. A passage 67 is provided in the flange 65 and adjacent portion of the upper side wall 20a of the basket 20.

A removable perforated lid 70 covers the top of the basket 20, said lid having a peripheral flange 72 overlying flange 65 of the basket and closely conforming thereto in dimensions and having a vertical shoulder 73 of substantially the same depth as the opening 67 in the top of basket wall 20a. Attached to lid 70 is a knurled sleeve 75 which snugly but removably engages the upper extremity of stem 16. The lid 70 is deformed to provide a radial channel 76 communicating with a central well 77 and leading out to passage 67.

It will be apparent that by manually rotating the lid 70 by means of the knurled sleeve 75, the effective size of passage 67 may be varied from a point where said passage is fully open to a point where it is completely closed. It will thus be seen that the amount of water discharged from the top of the stem 16 in the course of percolation and falling upon the lid 70 may be by-passed in a variable amount to the bottom of the container 13 via the outside of basket 20 or may be permitted to flow entirely through basket 20, thus varying the strength of the brew in a manner similar to that described in my first embodiment.

In the embodiment shown in FIG. 6 I have provided still another form of by-pass for accomplishing the same result. In this case stem 16, as above, extends through basket 20, discharging liquid upon the top of the basket, all of the discharged liquid in this case flowing through the contents of the basket. In this embodiment, however, a by-pass is provided below the basket for a portion of the fluid.

The stem 16 is provided with a passage 80 communicating with a passage 82 formed in a sleeve 85 rotatably mounted on stem 16 directly below basket 20, being retained thereon by suitable means such as bosses 87 formed on the stem.

A disk 90 may be attached to the bottom wall of the basket with suitable indicia exposed on the bottom thereof, and a pointer 92 is carried by sleeve 80. Thus, the user, by rotation of sleeve 80 and pointer 92 and coordinating the latter with the indicia of disk 90, may adjust the strength of brew, such strength being varied according to the amount of water permitted to by-pass the basket through passages 80 and 82.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:
1. A beverage brewer of the percolator type, comprising a container for liquid having a removable lid, a perforated basket for containing solids to be decocted, a hollow stem removably disposed in the container and supporting said basket in elevated position thereon, pump means at the lower extremity of the stem, a perforated, removable lid for the basket, said stem having a discharge opening above the level of said basket lid, variable by-pass means for returning to the container a portion of the liquid projected up the stem by said pump without said portion entering the basket, and manually operable means on the container lid for adjusting said by-pass means whereby the strength of the decoction may be controlled to a predetermined value.

2. A combination as in claim 1, wherein said adjusting means comprises a rotatable element in combination with indicia means, both on the outside of said container lid, for indicating the strength of the decoction, and the by-pass means includes means inside the lid keyed to said rotatable element for varying the quantity of by-passed liquid.

3. A combination as in claim 2, wherein the by-pass means includes aperture means permitting passage of liquid into the basket and means for varying the effective flow area of said aperture means.

References Cited in the file of this patent

UNITED STATES PATENTS

| | | |
|---|---|---|
| 821,445 | Warner | May 22, 1906 |
| 945,938 | Guterman | Jan. 11, 1910 |
| 1,160,684 | Ball | Nov. 16, 1915 |
| 2,615,385 | Smail | Oct. 28, 1952 |
| 2,667,827 | Peters | Feb. 2, 1954 |